United States Patent Office 3,396,959
Patented Aug. 13, 1968

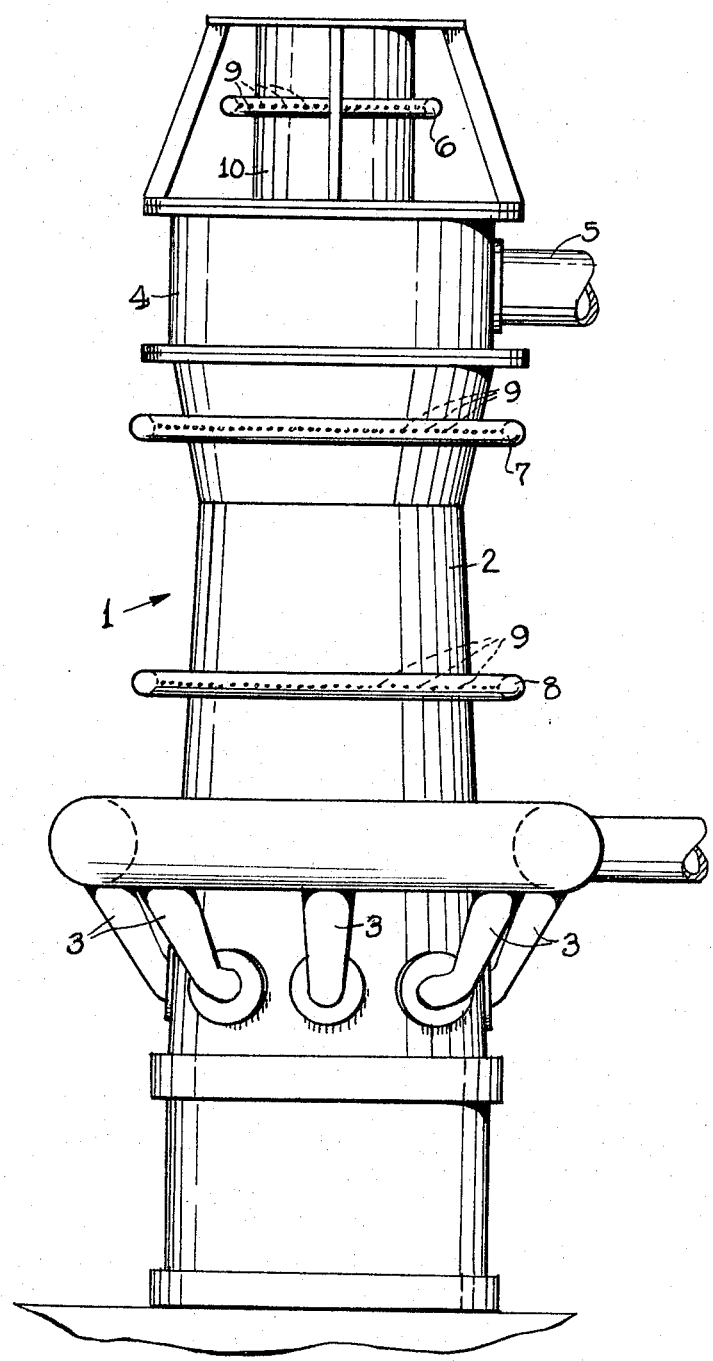

3,396,959
CUPOLA FURNACE WITH NONCORROSIVE
OUTER COATING
Fred L. Brown, Chicago, Ill., assignor to Interlake Steel Corporation, a corporation of New York
Filed Aug. 13, 1964, Ser. No. 389,416
12 Claims. (Cl. 266—32)

This invention relates to the art of water cooling high temperature furnace structures and particularly to improvements related to the cooling of the outside shell of a cupola furnace device used for the melting down of a metal charge used in the manufacture of steel.

In the manufacture of steel by the use of the recent basic oxygen process, a cupola furnace is required for melting down the metal charge to be presented to the basic oxygen converter which converts the metal charge into steel. It is customary that the cupola furnace be manufactured of steel which is subject to rusting and this constitutes the shell of the cupola furnace.

The cupola furnace is cooled at its outside surface by water sprayed onto the outer surface of the shell from rings of perforated pipe suitably supported and surrounding the shell at different levels of the cupola furnace. The water flows by gravity downwardly along the outside surface. The spray is provided in a large number of spray jet streams spaced sufficiently close to each other so that the water tends to flow along the entire outside surface of the shell as a continuous layer of water. As the cupola furnace ages, the amount of rust increases on the outside surface and builds up unevenly to different levels. This causes the water to bypass certain portions of the surface which portions are not then directly cooled by the water. The shell develops hot spots because of the uneven cooling to create high internal stresses in the shell and this leads to excessive cracking of the cupola shell.

It is the principal object of this invention to improve the construction of cupola furnaces by providing an improved surface on the outside of its shell on which surface the cooling water impinges. The improved surface is one which inhibits the formation of rust or other deleterious corrosion and encourages the even distribution of the cooling water over the entire surface to be cooled.

It is another object of the invention to provide such an improved surface for a cupola furnace which does not significantly change the thermal conductivity of the cupola furnace shell so that the heat transfer and cooling characteristics of the shell are not appreciably altered.

Other objects and advantages of the invention should become apparent upon reference to the accompanying drawing in which the figure shows a simplified drawing of a typical cupola furnace embodying the features of this invention.

The cupola furnace 1 shown stands vertically and embodies a hollow cylindrical shell 2 into which a charge of metal, such as scrap and pig iron is placed. The lower portion of the shell 2 is provided with incoming tuyeres which provide a hot blast from a suitable heat source which hot blast provides the heat for melting down the charge into a liquid form. The cupola furnace shown is provided with a gas chamber 4 having a gas exit pipe 5 leading from it which is used to exhaust the hot gasses and smoke produced during the operation of the cupola furnace.

At various locations along the level of the shell 2 are provided cooling rings 6, 7 and 8. These are rings of pipe provided with nozzle openings 9 at their inner peripheries through which spray jets of water are directed toward the outside surface of the shell 2. The cooling of the shell 2 is extremely important because the hot blast air causes the metal to be heated to approximately 2670° F. On an actual cupola of approximately 66 ft. height with a diameter at the top throat 10 of about 8 ft. and the remaining shell portion of about 15 ft., proper cooling of the shell 2 requires about 1100 gallons per minute of water. When the water is sprayed onto the shell 2 it flows downwardly along its surface by force of gravity. There are sufficient jet openings 9 in the cooling rings to provide enough flow to have the water cover the entire surface of the shell 2 as a continuous water layer. The cooling rings 6, 7 and 8 are supported by suitable means at the levels indicated, the number of cooling rings required and the levels where they are positioned is dependent upon the size of the jet nozzles and the area of the shell to be cooled.

Ordinarily the cupolas are manufactured from steel without any special coating on their outside surfaces. Rust formation occurs rapidly and the rust builds up in uneven formations. It becomes thicker in some places than others and is often built up in loalized scabs. These rust formations cause the water to break up into rivulets rather than as a continuous sheet of water extending over the entire surface of the shell. The result of this is uneven cooling of the shell 2 with development of hot spots and ultimate cracking of the shell 2 because of extreme temperature differentials in the shell creating high internal stresses in the shell metal.

The disadvantages of this rusting problem are overcome by the use of this invention. This is accomplished by first sandblasting the entire outside surface of the shell 2 for sufficient time to thoroughly remove all rust from the shell surface. For the size of cupola furnace mentioned, this can be accomplished with available sand or grit blasting equipment in a period of 50 to 60 hours with approximately 10,000 pounds of blasting grit. The result of sand blasting, in addition to removing the rust, is to provide a uniformly roughened surface of sandpaper texture which yields a very high number of minute paths for the water to flow as it pours over the shell 2. The sand blasted surface creates a condition which effectively increases the wetting ability of the surface. The water tends to spread evenly over such a surface without forming separate rivulets of water.

If rusting would not be a problem, such a sandpaper textured or roughened surface is probably sufficient to create the wetting effect desired. However, any rusting which occurs subsequently destroys the surface insofar as its proper wetting characteristics are concerned and the usual rust scabs build up. For this reason, the entire surface of the shell 2 is aluminized by applying a coating of aluminum of approximately .008 inch maximum thickness. This can be applied by a known metallizing or flame-spraying technique. One form of the flame-spraying technique involves drawing an aluminum wire or powder through the gun and its nozzle where the wire or powder is continually melted in an oxygen-acetylene gas flame and atomized by a compressed air blast which carries the metal particles to the sand blasted surface. Coating of the surface with aluminum in this manner prevents rusting of the surface and the deleterious buildup of uneven rust scale. It has been found that the problem of uneven water flow has been substantially eliminated by this technique, and without material change in the thermal conductivity of the shell 2 in any way adversely affecting its heat transfer characteristics over those of uncoated steel.

When the aluminum metal is applied by the flame-spraying process, it builds up in tiny droplets of metal one upon the other until the final thickness is reached. The buildup of metal produces a surface similar to the roughened sand blasted condition and is of a sandpaper texture. The surface still consists of a relatively uniformly uneven surface providing very minute closely spaced paths for the water to follow to keep the water flowing in a continuous sheet over the entire surface rather than in separated paths.

Although an aluminum coating, as described, is preferable, the cupola shell can be coated with other metals such as zinc, copper, tin, silver, cadmium, stainless steel, molybdenum or other metals which will inhibit and protect the surface from rusting. Their manner of application, for example, can be by the same process of flame-spraying from metal in wire or powder form. The layer of metal, such as aluminum, performs satisfactorily when of about .008 inch in thickness.

For the purpose of sealing the surface after the metal has been applied, a high temperature sealer paint or coating can be brushed or sprayed over the metal. This fills any spaces between the applied droplets exposed incidental to the base steel surface and inhibits corrosion of both the exposed base steel and the metal coating especially accelerated by heat. Aluminum particularly is subject to heat corrosion. A sealer effectively used over aluminum and available for this purpose from Metallizing Engineering, Inc. of Westbury, N.Y., is known by that company as "Metco M." It consists of a pulverized aluminum powder mixed with a pigmented bituminous or plastic binder and is applied in a very thin coating in about the consistency of ordinary aluminum paint. This sealer or other sealers are available when the other metals are used.

Although only certain forms of the invention have been shown and described, it should be clearly understood that the invention can be made in many different ways without departing from the true scope of the invention as defined in the appended claims.

I claim:

1. In a cupola furnace of a type having a chamber for enclosing a metal charge, means for heating the metal charge, said chamber being confined by a shell and means to cool the shell by means of a liquid coolant directed to flow along its outer surface, comprising, said shell having a base layer of ferrous metal coated with aluminum metal.

2. In a cupola furnace of a type having a chamber for enclosing a metal charge, means for heating the metal charge sufficiently to melt it, said chamber being confined by an outer shell, and means to cool the shell by means of a liquid coolant directed to flow along its outer surface, comprising said shell having a base layer of ferrous metal coated with a first layer of aluminum metal and said first layer being coated with a sealer.

3. In a cupola furnace of a type having a chamber for enclosing a metal charge, means for heating the metal charge sufficiently to melt it, said chamber being confined by an outer shell, and means to cool the shell by means of a liquid coolant directed to flow along its outer surface, comprising, said shell having a base layer of ferrous metal coated on its outside surface with a first layer of aluminum metal and said first layer being coated with a layer of sealer in the form of aluminum particles mixed with a bituminous binder.

4. In a cupola furnace of a type having a chamber for enclosing a metal charge, means for heating the metal charge sufficiently to melt it, said chamber being confined by an outer shell, and means to cool the shell by means of a liquid coolant directed to flow along its outer surface, comprising, said shell having a base layer of ferrous metal coated on its outside surface with a first layer of at least .008 inch thickness of aluminum and said first layer being coated with a layer of high temperature sealer in the form of aluminum particles mixed with a pigmented bituminous binder.

5. In a cupola furnace of a type having a chamber for enclosing a metal charge, means for heating the metal charge sufficiently to melt it, said chamber being confined by an outer shell, and means to cool the shell by means of a liquid coolant directed to flow along its outer surface, comprising, said shell having a base layer of ferrous metal having an outside surface which has been roughened by sand blasting and then coated with a first layer of aluminum applied by a flame-spraying process, said first layer being coated with a layer of high temperature sealer in the form comprising aluminum particles mixed with a pigmented bituminous binder.

6. In a cupola furnace of a type having a chamber for enclosing a metal charge, means for heating the metal charge sufficiently to melt it, said chamber being confined by an outer shell, and means to cool the shell by means of a liquid coolant directed to flow along its outer surface, comprising, said shell having a base layer of ferrous metal having an outside surface which has been roughened by sand blasting and then coated with a first layer of aluminum to a thickness of approximately .008 inch applied by a flame-spraying process, said first layer being coated with a layer of high temperature sealer.

7. In a cupola furnace of a type having a chamber for enclosing a metal charge, means for heating the metal charge sufficiently to melt it, said chamber being confined by an outer shell, and means to cool the shell by means of a liquid coolant directed to flow along its outer surface, comprising, said shell having a base layer of ferrous metal having an outside surface which has been roughened by sand blasting and then coated with an outer layer of a non-ferrous metal taken from the group consisting of zinc, aluminum, tin, copper, silver, stainless steel, cadmium and molybdenum, said outer layer being coated with a layer of high temperature sealer.

8. In a cupola furnace of a type having a chamber for enclosing a metal charge, means for heating the metal charge sufficiently to melt it, said chamber being confined by an outer shell, and means to cool the shell by means of a liquid coolant directed to flow along its outer surface, comprising, said shell having a base layer of ferrous metal having an outside surface which has been roughened and cleaned of substantially all rust and then coated with a first layer of a non-ferrous metal taken from the group consisting of zinc, aluminum, stainless steel, molybdenum, tin, copper, silver and cadmium, said first layer being coated with a high temperature paint.

9. In a cupola furnace of a type having a chamber for enclosing a metal charge, means for heating the metal charge sufficiently to melt it, said chamber being confined by an outer shell, and means to cool the shell by means of a liquid coolant directed to flow along its outer surface, comprising, said shell having a sandpaper textured ferrous metal surface covered by an adherent layer of a non-rusting metal having a roughened outer surface.

10. In a cupola furnace of a type having a chamber for enclosing a metal charge, means for heating the metal charge sufficiently to melt it, said chamber being confined by an outer shell, and means to cool the shell by means of a liquid coolant directed to flow along its outer surface, comprising, said shell having a ferrous metal surface covered by an adherent layer of a non-rusting metal having a roughened outer surface.

11. In a cupola furnace of a type having a chamber for enclosing a metal charge, means for heating the metal charge sufficiently to melt it, said chamber being confined by an outer shell, and means to cool the shell by means of a liquid coolant directed to flow along its outer surface, comprising, said shell having a ferrous metal surface covered by an adherent layer of a non-rusting metal having a roughened sandpaper texture outer surface covered with a layer of paint-like sealer applied thin enough so as not to remove motors 53 and 55 from the power circuit. surface.

12. In a cupola furnace of a type having a chamber for enclosing a metal charge, means for heating the metal charge sufficiently to melt it, said chamber being confined by an outer shell, and means to cool the shell by means of a liquid coolant directed to flow along its outer surface, comprising, said shell having a ferrous metal surface covered by an adherent layer of a non-rusting metal having a surface roughened with very small projections closely spaced to each other to provide closely adjacent paths between the projections for the liquid coolant to follow as it passes over the surface, the paths being sufficiently close to each other to cause the coolant following the separate paths to blend and thereby flow along said surface as a solid sheet of coolant.

References Cited

UNITED STATES PATENTS

| | | | |
|---|---|---|---|
| 2,711,311 | 6/1955 | Affleck et al. | 266—32 |
| 2,794,448 | 6/1957 | Marantz | 138—145 |
| 2,798,509 | 7/1957 | Bergquist | 138—145 |
| 2,982,312 | 5/1961 | Caplan et al. | 138—145 |

J. SPENCER OVERHOLSER, *Primary Examiner.*

E. MAR, *Assistant Examiner.*